(12) United States Patent
Hildebrand

(10) Patent No.: US 8,635,486 B2
(45) Date of Patent: Jan. 21, 2014

(54) APPARATUS AND METHOD OF CONTROLLING A PROCESSOR CLOCK FREQUENCY

(75) Inventor: Uwe Hildebrand, Fuerth (DE)

(73) Assignee: Intel Mobile Communications GmbH, Neubiberg (DE)

( * ) Notice: Subject to any disclaimer, the term of this patent is extended or adjusted under 35 U.S.C. 154(b) by 638 days.

(21) Appl. No.: 12/859,293

(22) Filed: Aug. 19, 2010

(65) Prior Publication Data

US 2012/0047390 A1    Feb. 23, 2012

(51) Int. Cl.
*G06F 1/08*    (2006.01)

(52) U.S. Cl.
USPC .............................. 713/501; 710/57

(58) Field of Classification Search
USPC ............................... 710/57; 713/501
See application file for complete search history.

(56) References Cited

U.S. PATENT DOCUMENTS

| 7,472,306 | B2 * | 12/2008 | Tsui et al. ..................... 713/600 |
| 7,783,905 | B2 * | 8/2010 | Chang et al. .................. 713/320 |
| 2005/0289621 | A1 * | 12/2005 | Mungula ....................... 725/100 |
| 2008/0085717 | A1 | 4/2008 | Chhabra et al. |

FOREIGN PATENT DOCUMENTS

WO    2004102965 A1    11/2004

\* cited by examiner

*Primary Examiner* — Albert Wang
(74) *Attorney, Agent, or Firm* — SpryIP, LLC

(57) ABSTRACT

An apparatus and a method of controlling a processor clock frequency are provided. The apparatus comprises a hardware counter to count write accesses to a memory buffer during a predetermined period of time, a hardware comparator to compare a number of write accesses counted by the hardware counter with at least one predetermined threshold value, the hardware comparator further to generate a control signal, the control signal being dependent on a result of a comparison of a number of write accesses counted by the hardware counter with at least one predetermined threshold value performed by the hardware comparator, and a clock frequency setting circuit to set a clock frequency of a processor depending on the control signal.

18 Claims, 5 Drawing Sheets

Interrupt Signal or HW Control Signal(s)

APPARATUS AND METHOD OF CONTROLLING A PROCESSOR CLOCK FREQUENCY

TECHNICAL FIELD

Embodiments of the invention relate generally to an apparatus and to a method of controlling a processor clock frequency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention.

DETAILED DESCRIPTION OF THE INVENTION

The following detailed description explains exemplary embodiments of the present invention. Where applicable the description of a method embodiment is deemed to describe also the functioning of a corresponding apparatus embodiment and vice versa. The description is not to be taken in a limiting sense, but is made only for the purpose of illustrating the general principles of the invention. The scope of the invention, however, is only defined by the claims and is not intended to be limited by the exemplary embodiments described below.

Figure 1:
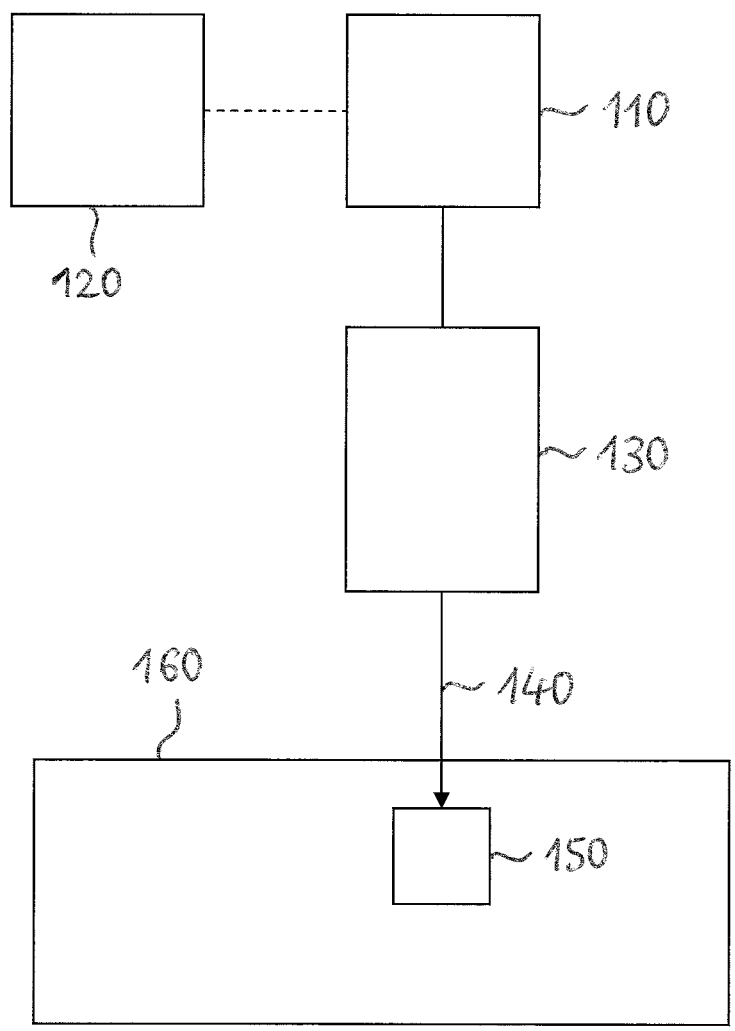
FIG. 1 shows a block diagram of an apparatus in accordance with an embodiment of the invention.

In FIG. 1 a block diagram of an apparatus in accordance with an embodiment of the invention is shown.

Dynamic scaling of the clock frequency of a central processing unit (CPU) is a power management mechanism which may be used for embedded systems and in particular for battery powered devices.

Looking closer in the technical field of mobile phone devices, the CPU performance demands in general and also the demands for adequate dynamic CPU performance scaling become continuously tougher as e.g. for cellular radio networks like LTE (Long Term Evolution) very high data rates and low latencies are targeted.

Therefore and for other reasons it is desirable that the demanded CPU performance (the time dependent performance requirement) can be predicted (or estimated) as early as possible in order to satisfy the processing time demands while still enabling adequate dynamic CPU clock scaling.

According to an embodiment of the invention, an apparatus comprises a hardware counter 110 to count write accesses to a memory buffer 120 during a predetermined period of time. The apparatus further comprises a hardware comparator 130 to compare a number of write accesses counted by the hardware counter 110 with at least one predetermined threshold value. The hardware comparator 130 is further configured to generate a control signal 140, the control signal 140 being dependent on a result of a comparison of a number of write accesses counted by the hardware counter 110 with at least one predetermined threshold value performed by the hardware comparator 130. The apparatus further comprises a clock frequency setting circuit 150 to set a clock frequency of a processor 160 depending on the control signal 140.

According to an embodiment of the invention, a hardware (HW) mechanism is provided that keeps track of the current data rate by counting write accesses to one or more memory buffers and that issues one or more control signals depending on the monitored data rate. The one or more control signals are used as an input for dynamic CPU clock scaling in order to realize a low-latency, data rate dependent CPU performance scaling.

This has the effect that the demanded CPU performance can be better estimated taking into account early available memory buffer state information as a measure of the variable data rate.

Since CPU clock frequency scaling is initiated directly by hardware (HW), latencies (delays) caused by software (SW) are avoided and the currently needed processor performance level is provided instantaneously and with high accuracy at any point of time.

This has the further effect that even very demanding real-time requirements, which occur in a time period when the processor clock is set to a very low frequency, can be met.

Figure 2:
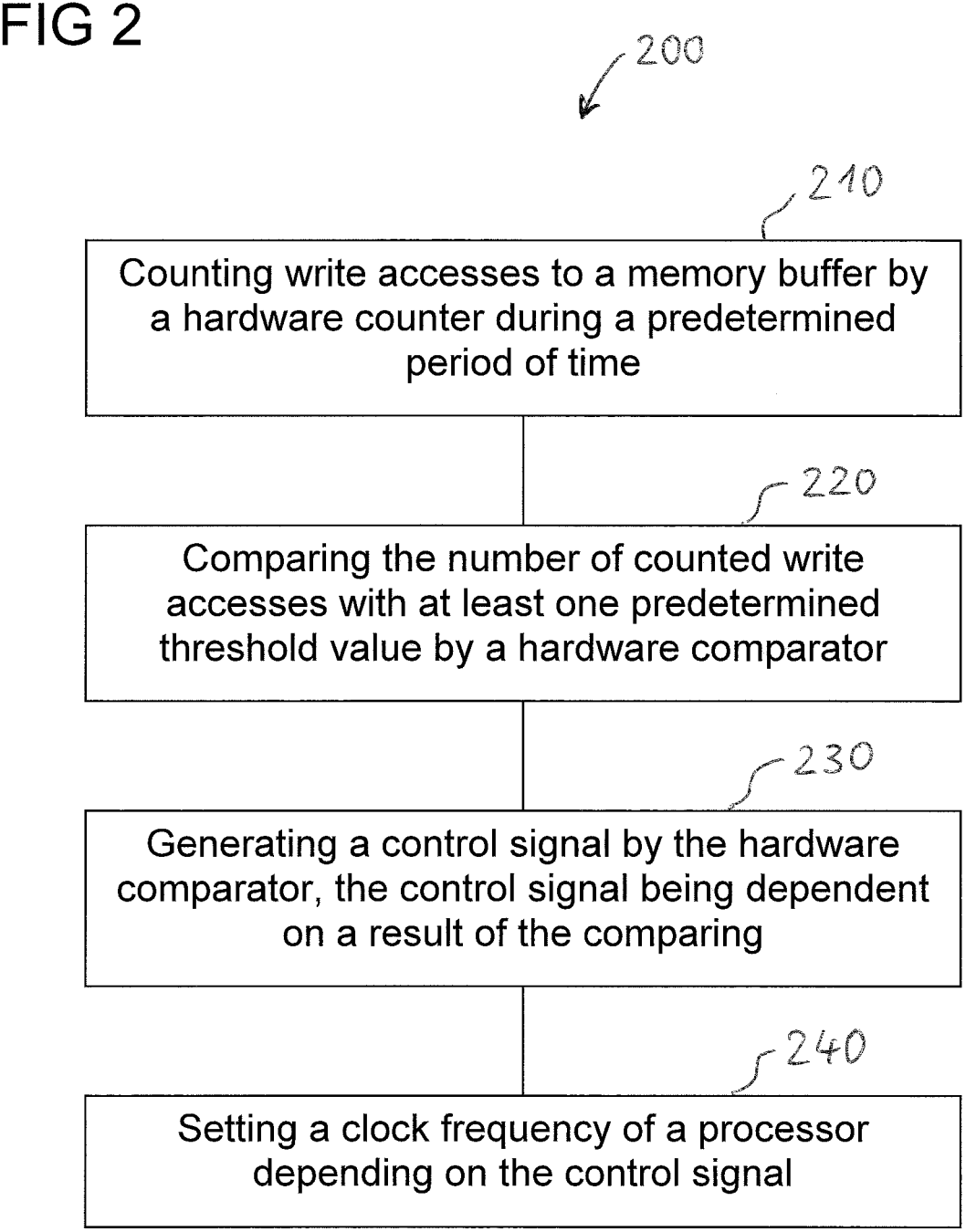
FIG. 2 shows a method of controlling a processor clock frequency in accordance with an embodiment of the invention in a flow diagram.

In FIG. 2 a method of controlling a processor clock frequency in accordance with an embodiment of the invention is shown in a flow diagram 200.

According to an embodiment of the invention, the following method is performed:

At 210, write accesses to a memory buffer are counted by a hardware counter during a predetermined period of time.

At 220, the number of counted write accesses is compared, by a hardware comparator, with at least one predetermined threshold value.

At 230, a control signal, which depends on a result of the comparing performed at 220, is generated by the hardware comparator. There may also be multiple control signals implemented which can be used to select one out of several supported CPU clock settings.

At 240, a clock frequency of a processor is set depending on the control signal.

Figure 3:
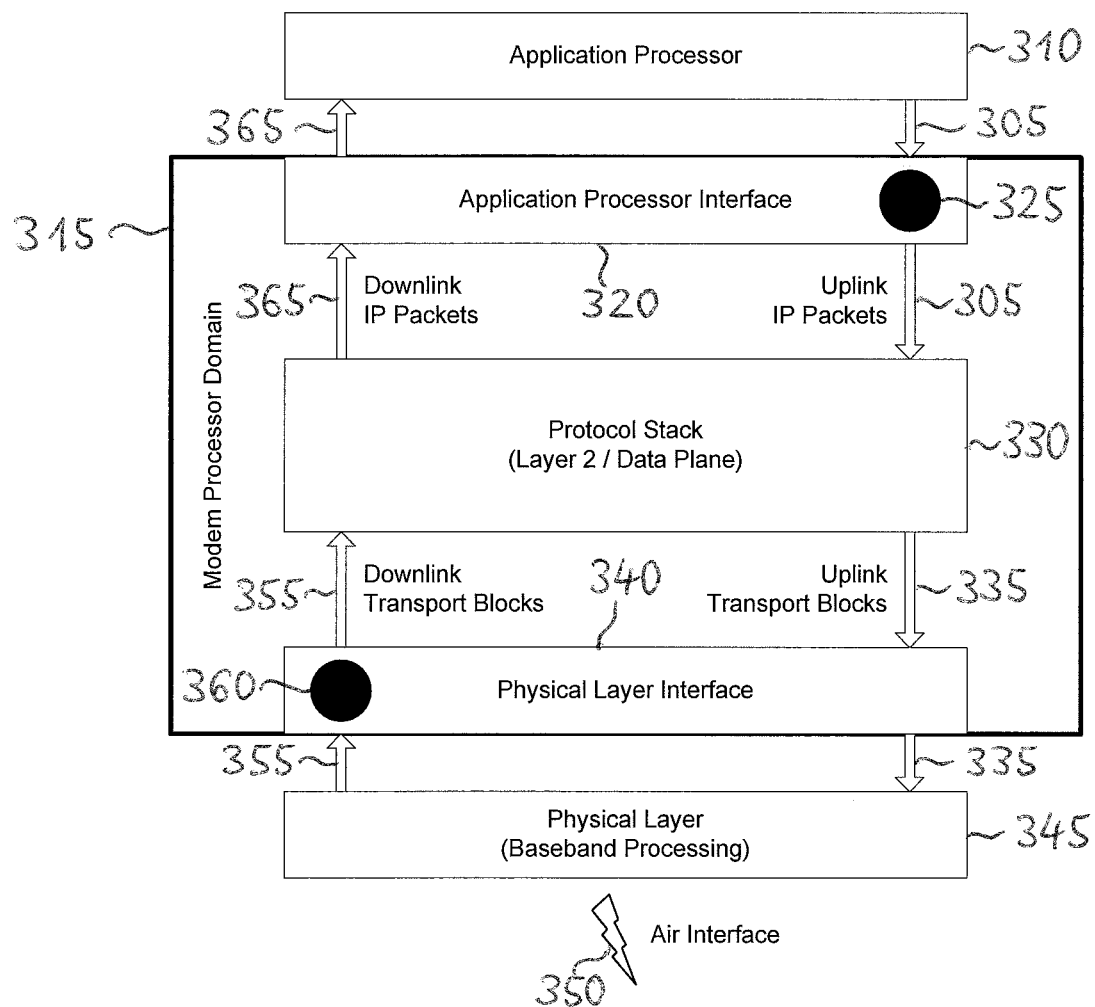
FIG. 3 shows a data plane architecture of a cellular modem in accordance with embodiments of the invention.

In FIG. 3 a data plane architecture of a cellular modem in accordance with embodiments of the invention is shown.

An exemplary data flow and exemplary data processing architecture of a typical cellular modem or wireless radio modem configuration, comprising dedicated modem and application processors, are illustrated here schematically. For such a modem CPU clock scaling may be of advantage since this case is an example of an embedded and battery powered device. It should be noted that this is not limited to cellular or wireless radio and that embodiments of the invention may be applied also to any other sort of data plane processing where a data rate may vary and CPU performance is data rate dependent.

The important design targets with respect to dynamic CPU clock scaling are that the currently applied CPU clock frequency must be high enough to fulfill the instantaneous CPU performance demands given by current work load and imposed real-time requirements, and on the other hand, the CPU clock frequency shall be limited as much as possible in order to minimize the system's power consumption.

According to one alternative, predication of CPU performance demands and/or scaling of CPU performance (i.e. CPU clock frequency) may be based on continuous monitoring of CPU utilization used for prediction of CPU load, possibly combined with some sort of averaging (typically executed by the CPU as a background activity).

Drawback of this alternative mainly is that such a general background mechanism for CPU clock scaling has certain minimum latency and is therefore not adequate for fast changing CPU performance demands (very dynamic data rates) together with hard real-time constraints.

According to another alternative, predication of CPU performance demands and/or scaling of CPU performance (i.e. CPU clock frequency) may be based on explicit CPU performance demands submitted by individual SW modules (may be derived e.g. from protocol stack states).

Major disadvantage of this alternative is that generally SW needs to be involved and as one consequence the current data rate must first be known to SW before it can control scaling of CPU clock frequency, which results in a delayed initiation of the necessary CPU performance scaling due to data-rate changes.

The CPU performance demands on a modem processor when processing data plane traffic depends heavily on the data rates in uplink direction and downlink direction. Therefore the proposed method uses memory buffer state information for controlling the CPU clock scaling. This information is early available as the memory buffers will be filled before the actual processing of the protocol stack layer 2 data plane functions takes place.

It can be seen from FIG. 3 that the uplink IP (internet protocol) packets 305 coming from the application processor 310 are entering the modem processor domain 315 at the application processor interface 320. The amount of received uplink IP data as observable at the uplink input buffer 325 of this interface will be used as a control information for generating a control signal for scaling the uplink processing related CPU performance. There may also be multiple control signals implemented which can be used to select one out of several supported CPU clock settings. So the processing of these uplink data by functions of the protocol stack layer 2 data plane 330 can take place with an accordingly adjusted modem processor clock frequency. After this processing, the uplink transport blocks 335 are passed on to the physical layer interface 340 and from that further on to the physical layer 345, where the baseband signal processing takes place. Finally the uplink data are sent via the air interface 350.

Likewise, downlink data received via the air interface 350 are processed in the physical layer 345. After that the downlink transport blocks 355 coming from the physical layer 345 are entering the modem processor domain 315 at the physical layer interface 340 and the amount of received downlink transport block data as observable at downlink input buffer 360 of this interface will be used as a control information for generating a control signal for scaling the downlink processing related CPU performance. There may also be multiple control signals implemented which can be used to select one out of several supported CPU clock settings. So the processing of these downlink data by functions of the protocol stack layer 2 data plane 330 can take place with an accordingly adjusted modem processor clock frequency. After this processing, the downlink IP packets 365 are passed on to the application processor interface 320 and from that further on to the application processor 310.

Depending on the kind of implemented application processor interface 320 and/or physical layer interface 340 the input memory buffers (uplink input buffer 325, downlink input buffer 360) may be dedicated shared memory regions in case of a shared memory based interface, or FIFO (first-in-first-out) type of memory buffers in case of another type of communication link (e.g. fast serial connection).

Figure 4:
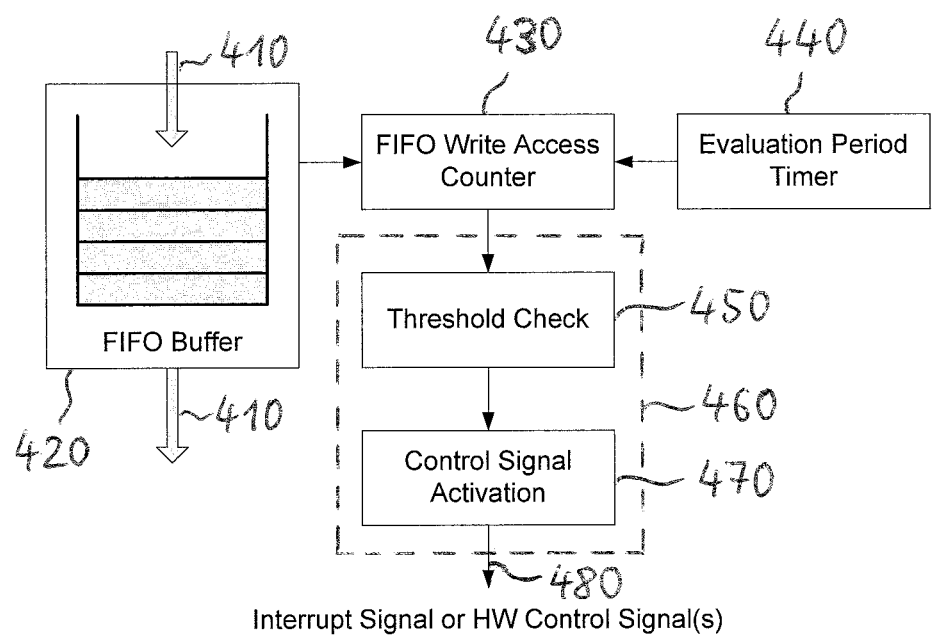
FIG. 4 shows a block diagram of an apparatus adapted to a first-in-first-out (FIFO) based data interface in accordance with an embodiment of the invention.

In FIG. 4 a block diagram of an apparatus adapted to a first-in-first-out (FIFO) based data interface in accordance with an embodiment of the invention is shown.

Here an example of the proposed HW circuit enabling data rate dependent CPU performance scaling for the case when a FIFO based type of interface is used for feeding data into the data processing chain (data plane) is illustrated schematically.

Generally, the currently applied data rate which is imposed on the data processing chain by incoming data 410 directly maps on the number of FIFO write accesses, to the FIFO buffer 420, per time period.

During each evaluation period the write accesses to the FIFO buffer 420 are counted by the hardware counter 430. At each evaluation period boundary, i.e. at the expiry of the evaluation period timer 440, the current write access counter value is latched and write access counting is restarted. The latched write access counter value is then, at 450, compared against one or more configured threshold values by the hardware comparator 460. Whenever a threshold value is exceeded, at 470 a corresponding control signal 480 is activated by the hardware comparator 460. Here exceeding a threshold value means both cases, i.e. the counter value becoming higher than a threshold value as well as the counter value becoming lower than a threshold value.

One or more upper threshold limits can be configured that trigger up-scaling step(s) of CPU clock frequency in case of increasing number of write accesses during an evaluation period. Likewise, one or more lower thresholds control down-scaling step(s) of CPU clock frequency.

Several options for control signal activation may be implemented:

In case the CPU clock scaling is performed by SW, then the control signal is an interrupt signal indicating to the SW being executed by the modem processor the need to perform a CPU clock frequency change.

In case the CPU clock scaling is performed by HW, then the control signal(s) is/are HW control signals indicating to the CPU clock scaling HW function the need to perform a certain CPU clock frequency change.

There may also be multiple control signals implemented which can be used to select one out of several supported CPU clock settings.

Figure 5:
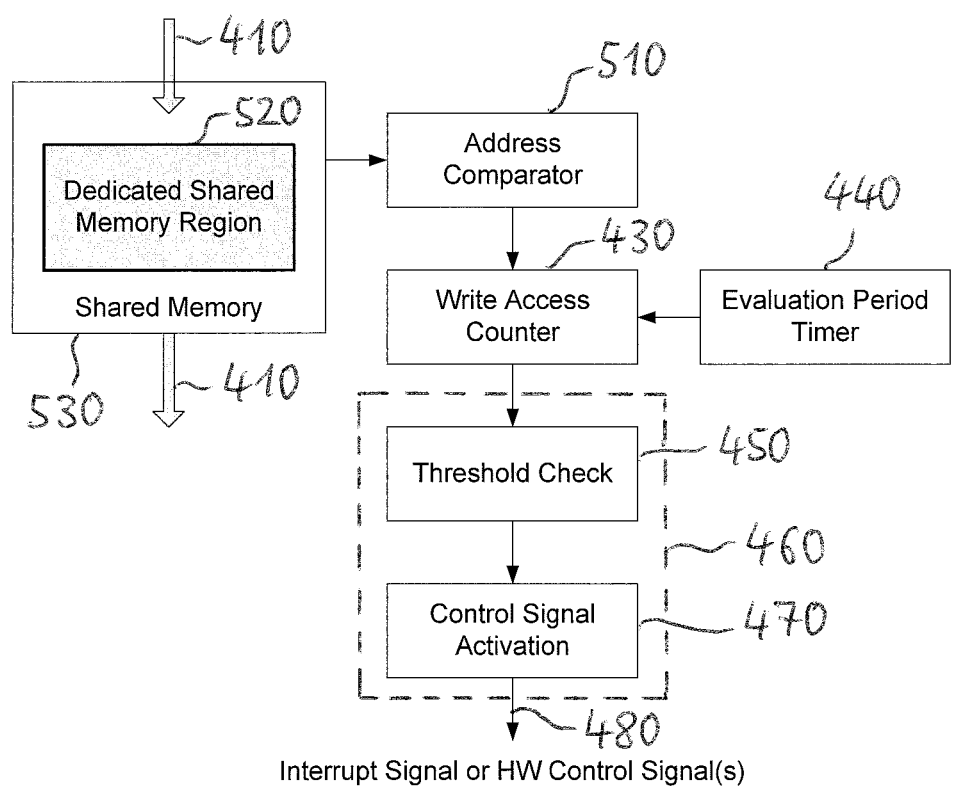
FIG. 5 shows a block diagram of an apparatus adapted to a shared memory based data interface in accordance with an embodiment of the invention.

In FIG. 5 a block diagram of an apparatus adapted to a shared memory based data interface in accordance with an embodiment of the invention is shown.

Here an example of the proposed HW circuit enabling data rate dependent CPU performance scaling for the case when a shared memory type of interface being used for feeding data into the data processing chain (data plane) is illustrated schematically. The basic principle is the same as for the FIFO based type of interface already described above while referring to FIG. 4.

In the current example, as can be seen from FIG. 5, in addition an address comparator 510 is used for a shared memory type of interface in order to be able to detect write accesses in a specific memory address area that is used for inter-processor communication. This means, the write accesses (per time period) writing incoming data 410 into the dedicated shared memory region 520 of the shared memory 530 are detected which map on the currently applied data rate which is imposed on the data processing chain.

During each evaluation period the write accesses to the dedicated shared memory region 520 of the shared memory 530 are counted by the hardware counter 430. At each evaluation period boundary, i.e. at the expiry of the evaluation period timer 440, the current write access counter value is latched and write access counting is restarted. The latched write access counter value is then, at 450, compared against one or more configured threshold values by the hardware comparator 460. Whenever a threshold value is exceeded, at 470 a corresponding control signal 480 is activated by the hardware comparator 460. Here exceeding a threshold value means both cases, i.e. the counter value becoming higher than a threshold value as well as the counter value becoming lower than a threshold value.

One or more upper threshold limits can be configured that trigger up-scaling step(s) of CPU clock frequency in case of increasing number of write accesses during an evaluation period. Likewise, one or more lower thresholds control down-scaling step(s) of CPU clock frequency.

In the current example again several options for control signal activation may be implemented:

In case the CPU clock scaling is performed by SW, then the control signal is an interrupt signal indicating to the SW being executed by the modem processor the need to perform a CPU clock frequency change.

In case the CPU clock scaling is performed by HW, then the control signal(s) is/are HW control signals indicating to the CPU clock scaling HW function the need to perform a certain CPU clock frequency change.

There may also be multiple control signals implemented which can be used to select one out of several supported CPU clock settings.

According to an embodiment of the invention, a cellular radio modem comprises an apparatus according to an embodiment of the invention.

According to another embodiment of the invention, a cellular radio modem is configured to carry out a method according to an embodiment of the invention.

According to a further embodiment of the invention, any embodiment defined by one of the claims may be combined with any one or more other embodiments defined by respective one or more of the other claims.

The invention claimed is:

1. An apparatus, comprising:
   a hardware counter to count write accesses to a memory buffer during a predetermined period of time;
   a hardware comparator to compare a number of write accesses counted by the hardware counter with at least one predetermined threshold value;
   the hardware comparator further to generate a control signal, the control signal being dependent on a result of a comparison of a number of write accesses counted by the hardware counter with at least one predetermined threshold value performed by the hardware comparator; and
   a clock frequency setting circuit to set a clock frequency of a processor depending on the control signal.

2. The apparatus as recited in claim 1, the clock frequency setting circuit further to set the clock frequency to a higher value if the number of write accesses counted by the hardware counter is higher than the at least one predetermined threshold value.

3. The apparatus as recited in claim 1, the clock frequency setting circuit further to set the clock frequency to a lower value if the number of write accesses counted by the hardware counter is lower than the at least one predetermined threshold value.

4. The apparatus as recited in claim 1, wherein the at least one predetermined threshold value comprises at least two predetermined threshold values.

5. The apparatus as recited in claim 4, the clock frequency setting circuit further to keep the clock frequency constant if the number of write accesses counted by the hardware counter is higher than a lower one of the at least two predetermined threshold values and is lower than a higher one of the at least two predetermined threshold values.

6. The apparatus as recited in claim 1, wherein the hardware counter comprises an address comparator.

7. The apparatus as recited in claim 1, wherein the control signal comprises a signal to trigger a software interrupt.

8. The apparatus as recited in claim 1, wherein the control signal comprises a signal to control a clock scaling hardware.

9. The apparatus as recited in claim 1, wherein the processor is subject to real-time constraints.

10. The apparatus as recited in claim 1, wherein the processor comprises a wireless modem processor.

11. The apparatus as recited in claim 1, the processor to process data according to a cellular radio protocol stack.

12. The apparatus as recited in claim 1, the memory buffer to buffer data which are to be processed according to a cellular radio protocol stack.

13. The apparatus as recited in claim 1, wherein the memory buffer comprises a first-in-first-out type buffer.

14. The apparatus as recited in claim 1, wherein the memory buffer comprises a dedicated shared memory region.

15. A method of controlling a processor clock frequency, comprising:
    counting write accesses to a memory buffer by a hardware counter during a predetermined period of time;
    comparing the number of counted write accesses with at least one predetermined threshold value by a hardware comparator; generating a control signal by the hardware comparator, the control signal being dependent on a result of the comparing; and
    setting a clock frequency of a processor depending on the control signal.

16. The method as recited in claim 15, further comprising:
    setting the clock frequency to a higher value if the number of write accesses counted by the hardware counter is higher than the at least one predetermined threshold value.

17. The method as recited in claim 15, further comprising:
    setting the clock frequency to a lower value if the number of write accesses counted by the hardware counter is lower than the at least one predetermined threshold value.

18. The method as recited in claim 15, further comprising:
    keeping the clock frequency constant if the at least one predetermined threshold value comprises at least two predetermined threshold values and the number of write accesses counted by the hardware counter is higher than a lower one of the at least two predetermined threshold values and is lower than a higher one of the at least two predetermined threshold values.

* * * * *